UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 610,615, dated September 13, 1898.

Application filed April 23, 1898. Serial No. 678,631. (No specimens.)

*To all whom it may concern:*

Be it known that I, JOHN H. STEVENS, of the city of Newark, county of Essex, and State of New Jersey, have invented certain new and useful Improvements in Pyroxylin Compounds, of which the following is a specification.

Pyroxylin is well known as the product resulting from the action of a mixture of nitric and sulfuric acids on cellulose fiber, especially in the form of cotton or paper. While pyroxylin is a neutral substance, the nitro elements contained in it cause it to be the subject of an acid decomposition. This decomposition extends also to its compounds with solvents. To prevent or minimize this decomposition and the deleterious effects arising therefrom, it has been more or less customary to combine the pyroxylin or its compounds with some antacid or neutralizing agent, like carbonate of magnesium or urea, for instance. The different effects require a large number of antacid substances to select from, and hence any addition to those already known is welcome to the operator. I find that lactophosphate of calcium is a useful antacid substance and can be combined or mixed with pyroxylin and its compounds with solvents, so as to retard or prevent the decomposition referred to. It is soluble in alcoholic solvents and also in water and can be combined with the pyroxylin by means of water, or when solvents are used it can be dissolved in wood-spirit or in grain-alcohol and then added to the mixture, or it can be intimately combined with the mixture by grinding or masticating operations. The calcium lactophosphate does not interfere seriously with the transparency of pyroxylin compounds, and therefore can be used in making the thin transparent sheets so much in demand for decorative purposes and can also be used in protecting pyroxylin imitation of tortoiseshell against decomposition. After adding it to the pyroxylin in aqueous solution I dry out the water, which leaves the pyroxylin protected, although it is understood that the pyroxylin still possesses its other properties, such as explosiveness and inflammability. As to proportions, I find that two per cent. of the salt, by weight, to the pyroxylin is a very good proportion. Obviously I do not confine myself to any definite proportion.

Calcium lactophosphate belongs to a class of substances known as the "salts of lactophosphoric acid." I find that this entire series of salts possess more or less antacid power, according to the nature of the base in combination with the acid and especially according to the solubility of the salt, more particularly with respect to its solubility in alcoholic solvents. The lactophosphate of potassium is also an excellent antacid, and I have used it in the proportion specified for the calcium salt in making transparent pyroxylin sheets and in imitation of clear tortoise-shell. The sodium salt is also useful, more especially for non-transparent effects. Among the other salts of this series which I have used are lactophosphate of bismuth, iron, magnesium, and manganese. These salts are not equal to the calcium or potassium salts for the purpose, although they possess more or less antacid power. I prefer the calcium salt above all, and next to that the potassium salt.

As it is well known that there is no true chemical compound which can be called "lactophosphoric acid," I cannot give the formula for it. The bodies which I include in this specification under the names of "lactophosphate of calcium," "lactophosphate of potassium," "lactophosphate of bismuth," "lactophosphate of iron," "lactophosphate of magnesium," and "lactophosphate of manganese" are well-known commercial substances which can be procured from any large chemical dealer, and it is to those substances that I refer. They are not salts of lactophosphoric acid, as the name might seem to imply, but are generally considered a mixture of lactates and phosphates of these different metals, respectively, and it is to these commercial products which I have used that my invention is confined.

A determination of specimens of the lactophosphates that I have used show the following formulas, respectively:

Calcium lactophosphate, $Ca(C_3H_5O_3)_2.Ca_2H_2(PO_4)_2$.
Potassium lactophosphate, $KC_3H_5O_3.K_2HPO_4$.
Bismuth lactophosphate, $BiH(C_3H_5O_3)_2.BiPO_4$.
Iron lactophosphate, $Fe(C_3H_5O_3)_2.Fe_2(PO_4)_2$.
Magnesium lactophosphate, $Mg(C_3H_5O_3)_2.Mg_2H_2(PO_4)_2$.
Manganese lactophosphate, $Mn(C_3H_5O_3)_2.Mn_3(PO_4)_2$.

These were ordinary commercial products, sold as "lactophosphates;" but as it is well known that these commercial products always vary slightly in composition I do not confine myself to lactophosphates having these specific formulas mentioned; but my invention includes the lactophosphates of commerce, even though they do not conform with strictness to the formulas given.

The art of manufacturing pyroxylin and its compounds is well understood, and no further description is needed in order to inform the operator. He will appreciate the novelty and usefulness of my invention.

Having fully instructed the operator in my invention, what I claim, and desire to secure by Letters Patent, is—

1. A pyroxylin composition of matter consisting of pyroxylin and a lactophosphate substantially as described.

2. A pyroxylin composition of matter consisting of pyroxylin, a solvent of the same, and a lactophosphate substantially as described.

3. A pyroxylin composition of matter containing pyroxylin and lactophosphate of calcium.

JOHN H. STEVENS.

Witnesses:
WALTER P. LINDSLEY,
S. M. COOLEY.